(12) United States Patent
Liao et al.

(10) Patent No.: US 8,278,775 B2
(45) Date of Patent: Oct. 2, 2012

(54) SWIRLY FLUID SPRINKLER

(75) Inventors: Jung-Huang Liao, Zhubei (TW);
Tzeng-Wuu Wey, Hsinchu (TW);
Jing-Lyang Jeng, Zhubei (TW); Jia-Wei Jan, Changhua County (TW); I-Te Huang, Hsinchu (TW)

(73) Assignee: Industrial Technology Research Institute, Hsin-Chu (TW)

( * ) Notice: Subject to any disclaimer, the term of this patent is extended or adjusted under 35 U.S.C. 154(b) by 533 days.

(21) Appl. No.: 12/609,565

(22) Filed: Oct. 30, 2009

(65) Prior Publication Data
US 2011/0012359 A1      Jan. 20, 2011

(30) Foreign Application Priority Data
Jul. 14, 2009 (TW) .................. 98123736 A

(51) Int. Cl.
*F03B 13/00* (2006.01)
*H02P 9/04* (2006.01)
(52) U.S. Cl. ........................................... 290/54
(58) Field of Classification Search ............. 290/43, 290/54, 52
See application file for complete search history.

(56) References Cited

U.S. PATENT DOCUMENTS

| | | | |
|---|---|---|---|
| 4,616,298 A | 10/1986 | Bolson | |
| 4,731,545 A * | 3/1988 | Lerner et al. | 290/54 |
| 6,864,591 B2 | 3/2005 | DeFrank | |
| 6,885,114 B2 * | 4/2005 | Baarman et al. | 290/43 |
| 7,067,936 B2 * | 6/2006 | Baarman et al. | 290/43 |
| 7,571,867 B2 * | 8/2009 | Hu | 239/383 |
| 8,109,645 B2 * | 2/2012 | Liao | 362/192 |
| 2003/0147238 A1 | 8/2003 | Allen et al. | |
| 2005/0157493 A1 | 7/2005 | Clark | |
| 2007/0126237 A1 * | 6/2007 | Liao et al. | 290/43 |

FOREIGN PATENT DOCUMENTS

| | | |
|---|---|---|
| CN | 201025219 Y | 2/2008 |
| GB | 1406677 A | 9/1975 |
| TW | M259848 U | 3/2005 |
| TW | I269850 B | 1/2007 |

OTHER PUBLICATIONS

Intellectual Property Office, Ministry of Economic Affairs, R.O.C., "Office Action", Apr. 2, 2012, Taiwan.
State Intellectual Property Office of the People's Republic of China, "Office Action", May 23, 2012, China.

* cited by examiner

*Primary Examiner* — Javaid Nasri
(74) *Attorney, Agent, or Firm* — Morris Manning & Martin LLP; Tim Tingkang Xia, Esq.

(57) ABSTRACT

The present invention provides a swirly fluid sprinkler comprising a sprinkling body, a fluid guide, and an electrical generator. The fluid guide disposed inside the fluid inlet of the sprinkling body includes a plurality of swirl channels for dividing a fluid flow into a plurality of swirly fluid flows. The electrical generator disposed inside the sprinkling body and opposite to the fluid guide has a plurality of blades disposed on the top thereof. Each of the blades has an inclining angle wherein the blade surface opposite to the fluid guide has an angle in relation to the corresponding swirly fluid for receiving the propelling force from the swirly fluid so as to rotate the electrical generator and thereby generate electrical power. In another embodiment, the swirly fluid sprinkler further has a lighting module for providing illumination while the water spray is discharged.

14 Claims, 15 Drawing Sheets

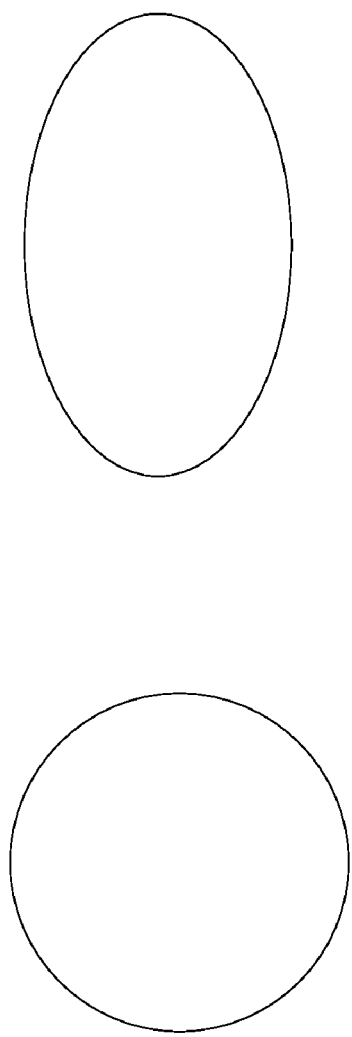
FIG.5A
FIG.5B
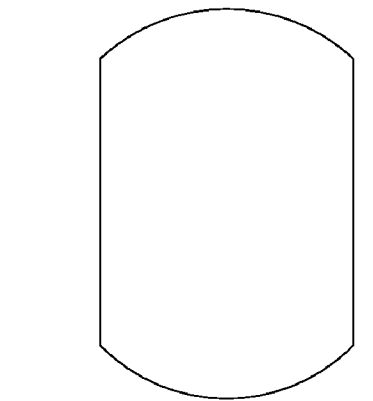
FIG.5E
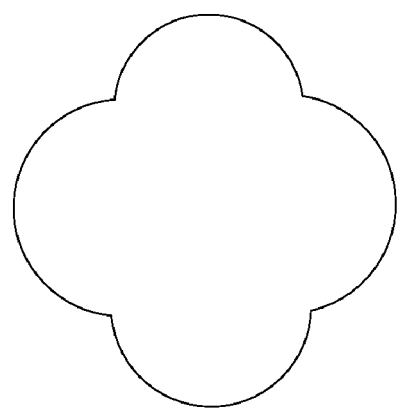
FIG.5D
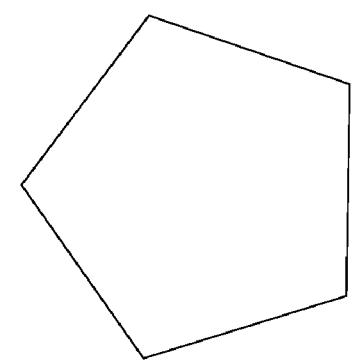
FIG.5C

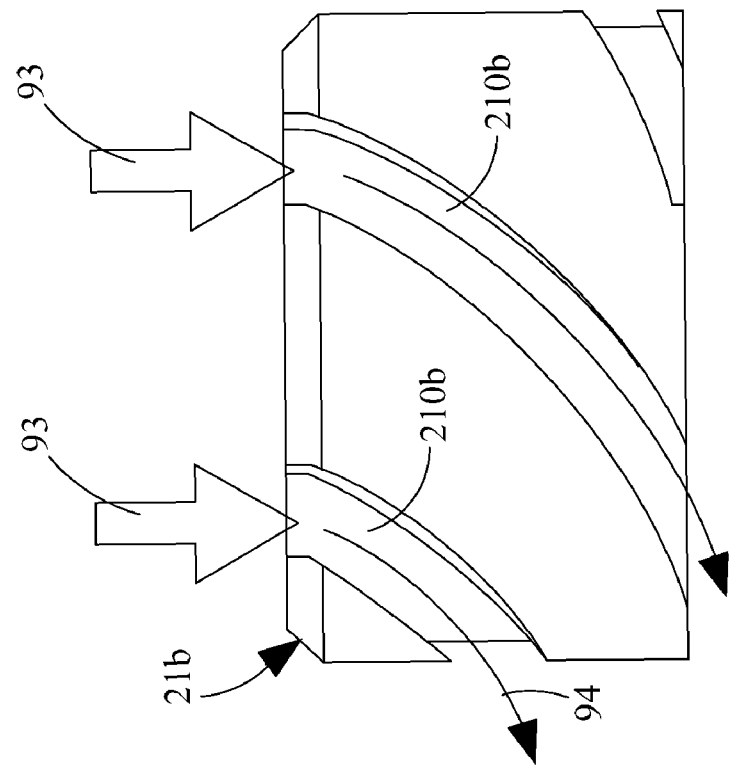
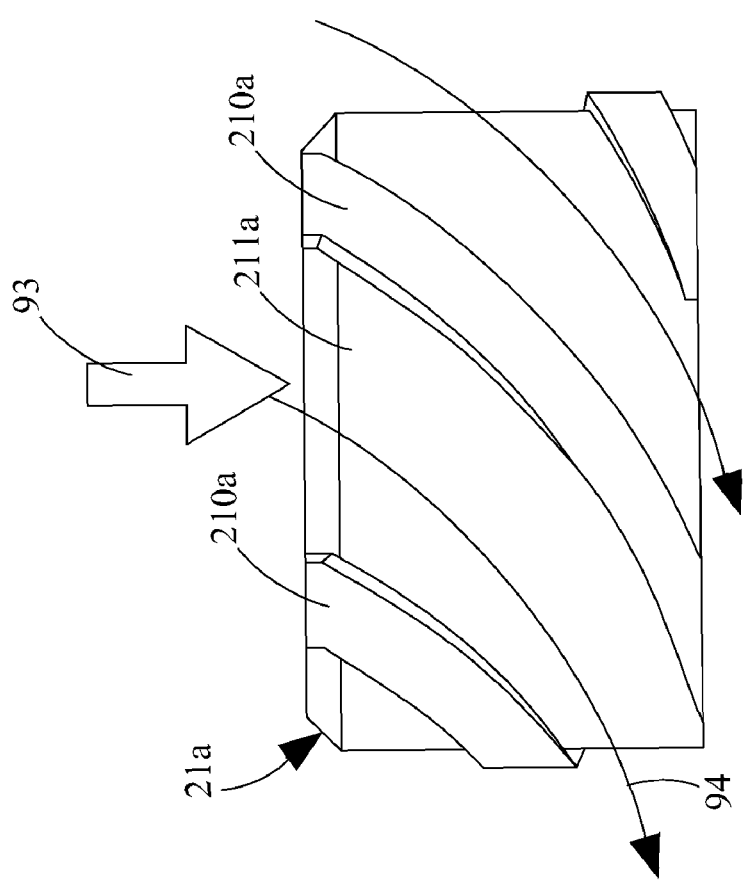

SWIRLY FLUID SPRINKLER

FIELD OF THE INVENTION

The present invention relates to a sprinkler, and more particularly, to a swirly fluid sprinkler configured with swirl channels and illuminating module.

BACKGROUND OF THE INVENTION

It is strange that fire accidents often happened at night and are usually going to cause power outage to the whole building. Not to mention that it only takes minutes for thick black smoke to fill a building. Therefore, if you wake up to a fire, it is more than likely that you are trapped in an entirely pitch-black environment which is going to cause troubles or even dangers to you while trying to escape from the burning building.

In most buildings, only at specific locations relation to designated escape routes leading to emergency exits, such as floor level exits or staircases, are required by current building safety regulation to have emergency lightings or escape signs for ensuring the lighting is provided promptly, automatically and for a suitable time in a specific area when the normal power supply to the normal lighting fails, as those shown in FIG. 1. However, there can be not enough emergency lightings or escape signs in the building to ensure that persons in the building can evacuate safely in an event of emergency since they are only being required by regulation to be installed in the building only at certain designated locations and exits. Moreover, those emergency lightings or escape signs can easily either be blocked by smoke form being seen by persons trapped in building since during a fire that it only takes minutes for thick black smoke to fill a building, or can be damaged by fire, so that they may not function as expected during emergency.

In addition, as those emergency lightings or escape signs are usually powered by battery, they are mostly likely to malfunction due to battery failure or insufficient power stored in the battery. Therefore, it is required to check or replace the batteries in those emergency lightings or escape signs in a regular basis which can be most troublesome.

There are already many studies relating to the aforesaid disadvantages. One of which is a technique of liquid driven generator for low power electrical component disclosed in TW Pat. No. I269850. The low power electrical component can be a light capable of being powered by a generator as the generator is designed to be driven to rotate by a fluid flow for generating electricity accordingly. Operationally, the generator can be installed in a fire-sprinkler so that when the fire-sprinkler is activated for discharging water, the generator can be driven to rotate and thus generate electricity for providing power to the light module that is also being installed in the fire-sprinkler. Since there can be an array of such fire-sprinklers being arranged on the ceilings of any building, they can provide sufficient illumination for persons trapped in the building when they are being activated by fire accident. Another such study is a water-power light disclosed in U.S. Pat. No. 4,616,298, that it is substantially an illumination device adapted for sprinkler systems for enabling the same to be powered by an axial generator with radial blades while the radial blades are driven to rotate by a flow of water in the sprinkler systems.

Please refer to FIG. 2, which is a schematic diagram showing how a flow of water is impinging by an angle upon a blade of a conventional water-powered generator. In FIG. 2, since the water flow 90 is moving linearly, the propelling force of the water flow 90 can not be fully received by the blade 91 for driving the same to rotate so that the electric-generating efficiency of the resulting generator is not satisfactory.

SUMMARY OF THE INVENTION

The present invention provides a swirly fluid sprinkler, which has a fluid guide with swirl channel disposed at a side of its fluid inlet, to be used for splitting a fluid flow into a plurality of swirly fluid flows as the fluid flow flowing passing through the fluid guide while directing the plural swirly fluid flows to impinge effectively upon blades of a generator so as to propel the same to rotate with satisfactory rotation speed and thus enhance the electric-generating efficiency of generator.

The present invention provides a swirly fluid sprinkler, which is designed to use a fluid guide to maximize the momentum of a fluid flow using least possible amount of fluid, by that a generator can be driven to rotate in an efficient manner without having to raise the pressure of the fluid flow flowing through the fluid guide, and thus the power output of the generator is maximized under current fluid pressure.

In an exemplary embodiment, the present invention provides a swirly fluid sprinkler comprising: a sprinkling body, having a fluid inlet and a fluid outlet; a fluid guide, disposed inside the fluid inlet of the sprinkling body and configured with a plurality of swirl channels for dividing a fluid flow into a plurality of swirly fluid flows; and an electrical generator, disposed inside the sprinkling body at a position corresponding to the fluid guide, having a plurality of blades, each inclinedly disposed thereon by an inclining angle; wherein an angle is formed between a surface of each blade facing toward the fluid guide and its corresponding swirly fluid flows impinging thereon so that the propelling forces from the swirly fluid flows can be received thereby to be used for rotating the electrical generator and thereby causing the same to generate an electrical power output.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein:

FIG. 5A to FIG. 5E are cross sectional views of different swirl channels used in the invention.

FIG. 7A and FIG. 7B are schematic diagrams showing two different fluid guides according to two embodiments of the invention.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 3:
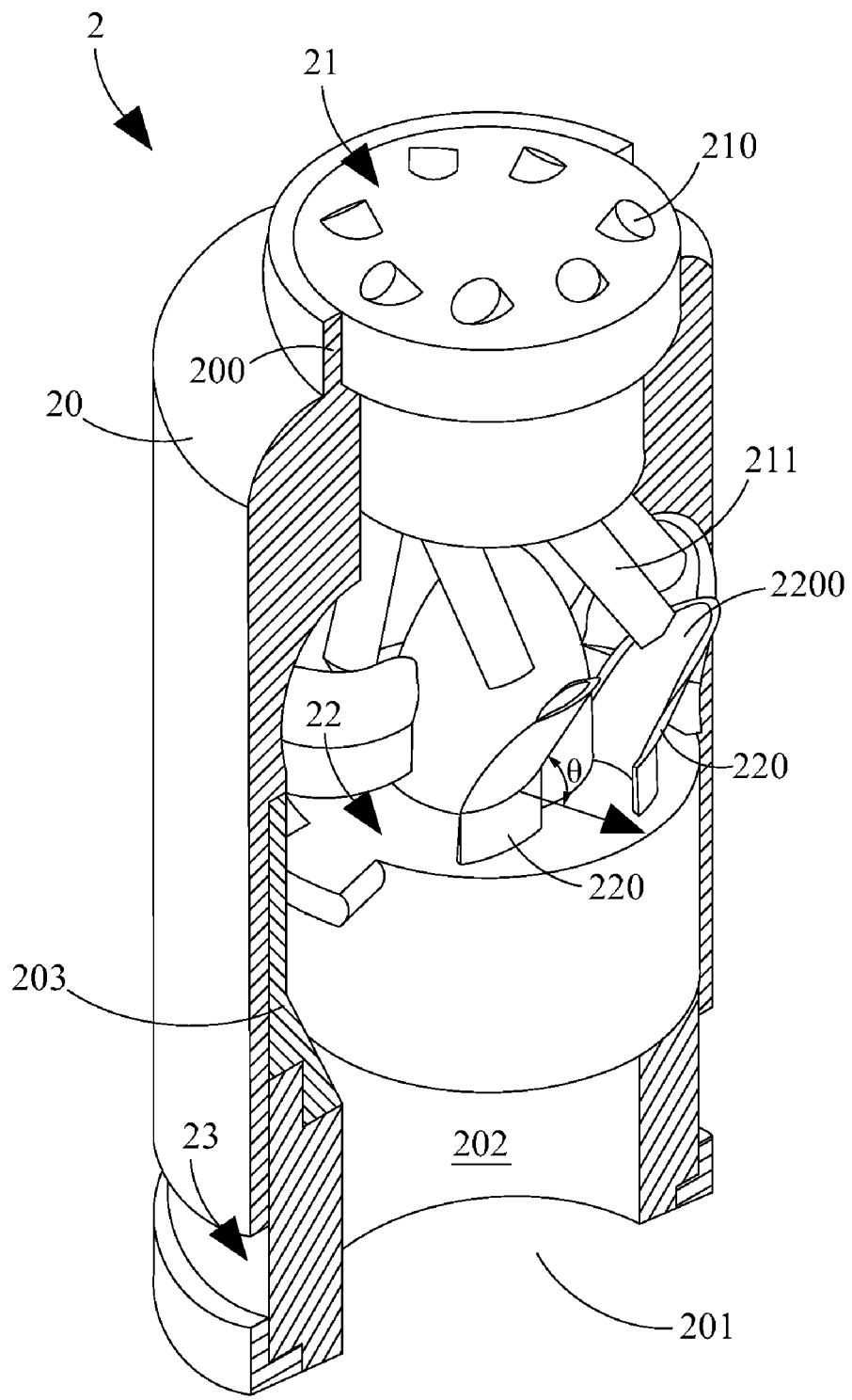
FIG. 3 is a schematic diagram showing across section of a swirly fluid sprinkler according to the present invention.
Figure 4A:
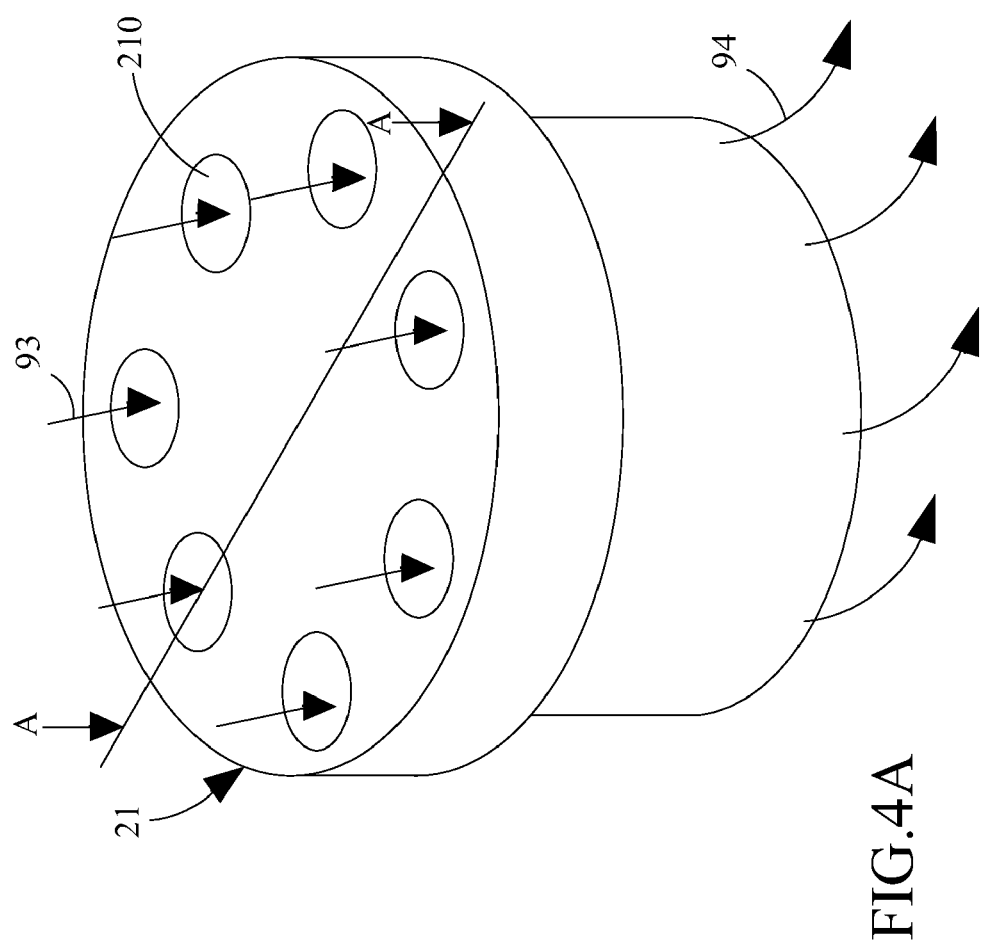
FIG. 4A is a schematic diagram showing a fluid guide according to a first embodiment of the invention.
Figure 4B:
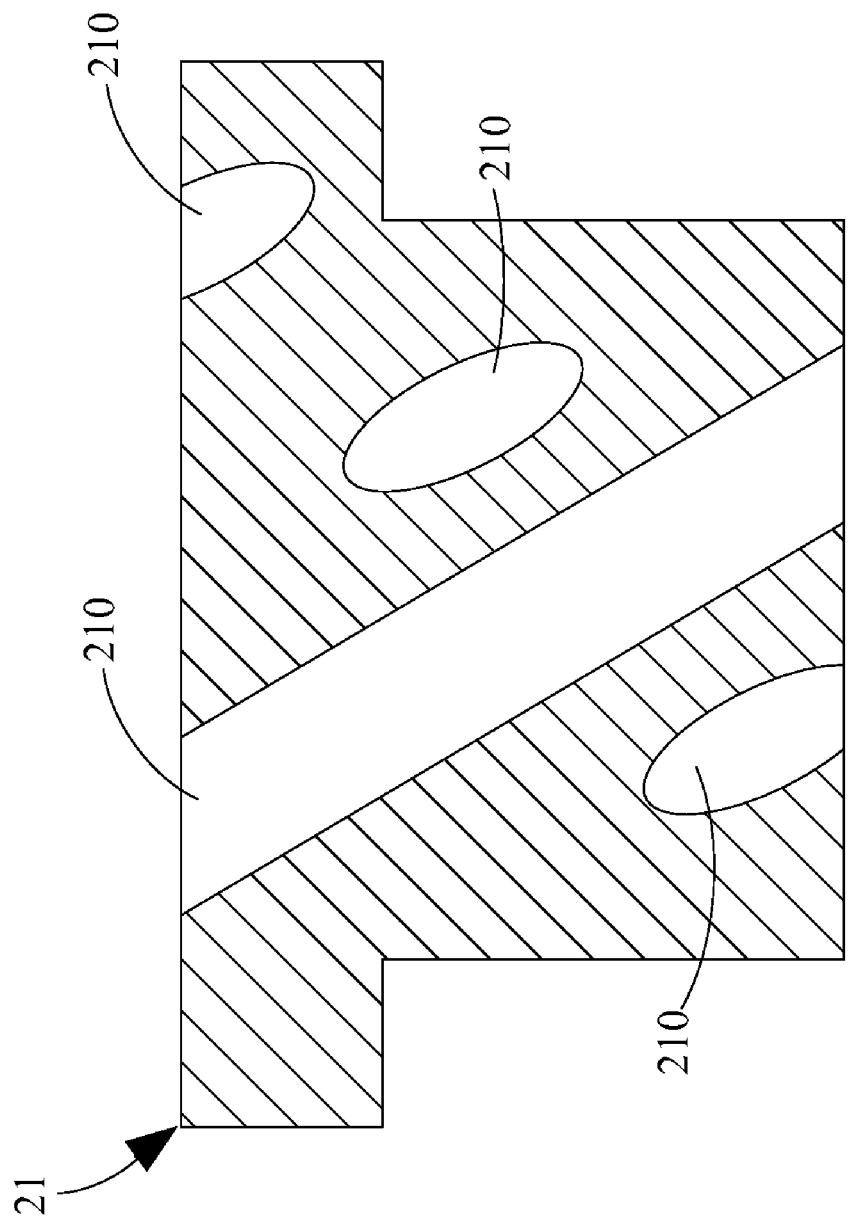
FIG. 4B is an A-A sectional view of FIG. 4A.

Please refer to FIG. 3, which is a schematic diagram showing a cross section of a swirly fluid sprinkler according to the present invention. In FIG. 3, the swirly fluid sprinkler 2 has a sprinkler body 20, which is configured with a fluid inlet 300 and a fluid outlet 201. Moreover, there is an accommodation space 202 formed inside the sprinkler body 20, and a fluid guide 21 disposed inside fluid inlet 201 of the sprinkler body 20. Please refer to FIG. 4A and FIG. 4B, which are a schematic diagram showing a fluid guide according to a first embodiment of the invention, and a A-A sectional view of FIG. 4A. In this embodiment, there are seven swirl channels 210 in the fluid guide 21, but it is defined according to the space available in the fluid guide so that it is not limited thereby. As shown in FIG. 3, each swirl channel 210 in the fluid guide 21 is connected to a tube 211 so that each swirl channel 210 is substantially extending outside the fluid guide 21 by a specific distance. Please refer to FIG. 4C, which is a schematic diagram showing a swirl channel extending outside the fluid guide according to an embodiment of the invention. In this embodiment, each swirl channel 210 is formed spinning along a specific axis 92 so as to result in the appearance of vortices in the fluid flowing therein. When a fluid is introduced into the fluid guide 21 through the fluid inlet 200, the flow of the fluid is divided into a plurality of sub-flows 93 flowing in the plural swirl channels 210. When each sub-flows 93 flowing in its corresponding swirl channel 210, it is turned into a swirly fluid flow by the influence from the structure of the swirl channel 210. In this embodiment, the fluid used is water, but is not limited thereby.

Figure 6:
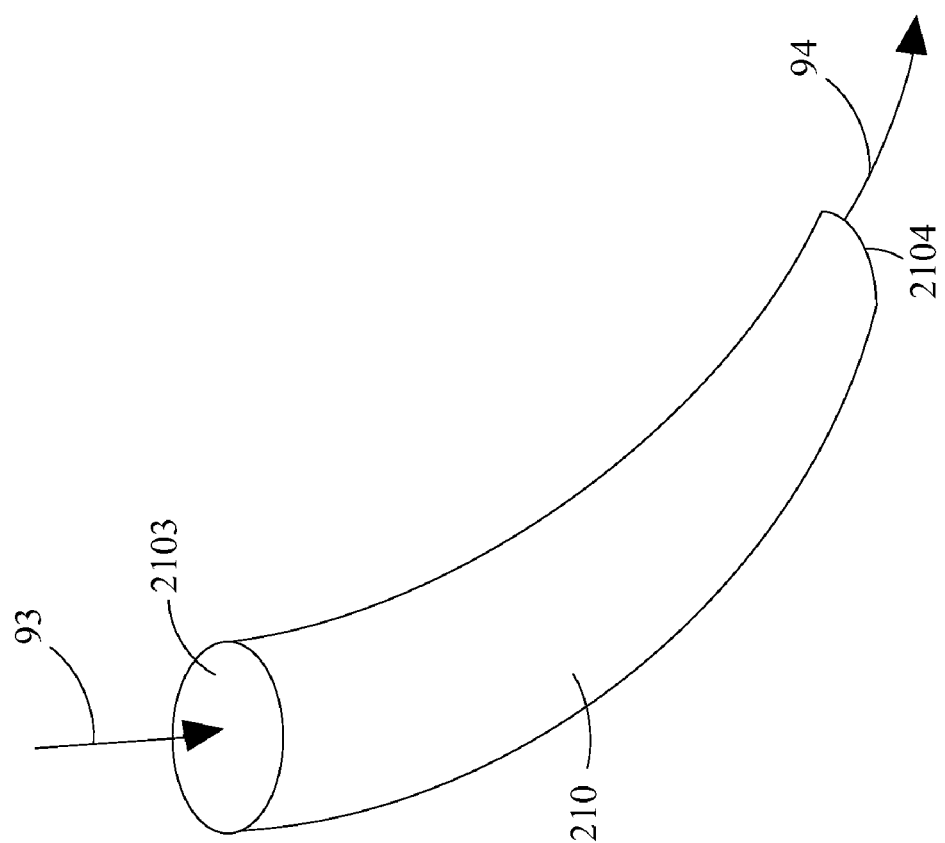
FIG. 6 is a schematic diagram showing a swirl channel according to another embodiment of the invention.

Please refer to FIG. 5A to FIG. 5E, which are cross sectional views of different swirl channels used in the invention. As shown in FIG. 5A to FIG. 5E, the cross section of each swirl channel is formed in a shape selected from the group consisting of: a circular shape, an oval shape, a polygon, a geometrical shape defined by curves, and a geometrical shape defined by curved and straight lines. Moreover, the sectional area of each swirl channel 210 can be reduced with respect to the flowing direction of the fluid. As shown in FIG. 6, the sectional area of each swirl channel 210 is reduced gradually from its fluid entrance end 2103 to its fluid exit end 2104. Thereby, the propelling force of the resulting swirly fluid flow 94 can be increased since the flowing speed of the swirly fluid flow 94 is increasing with the reducing of the channel's sectional area.

Please refer to FIG. 7A and FIG. 7B, which are schematic diagrams showing two different fluid guides according to two embodiments of the invention. In the embodiments shown in FIG. 7A and FIG. 7B, the swirl channels are not formed inside the fluid guide as those shown in FIG. 4A, but is formed on the outer wall of the fluid guide. In the embodiment shown in FIG. 7A, there are a plurality of spiral columns 210a formed on the circumference of the fluid guide 21a, by that there are grooves being defined between any two neighboring column 210a so as to be used as the plural swirl channels 211a. In the embodiment shown in FIG. 7B, the fluid guide 21b is configured with a plurality of spiral grooves 210b on the circumference thereof to be used as the plural swirl channels to be used for converting fluid flow flowing therein into swirly fluid flows 94.

Figure 8B:
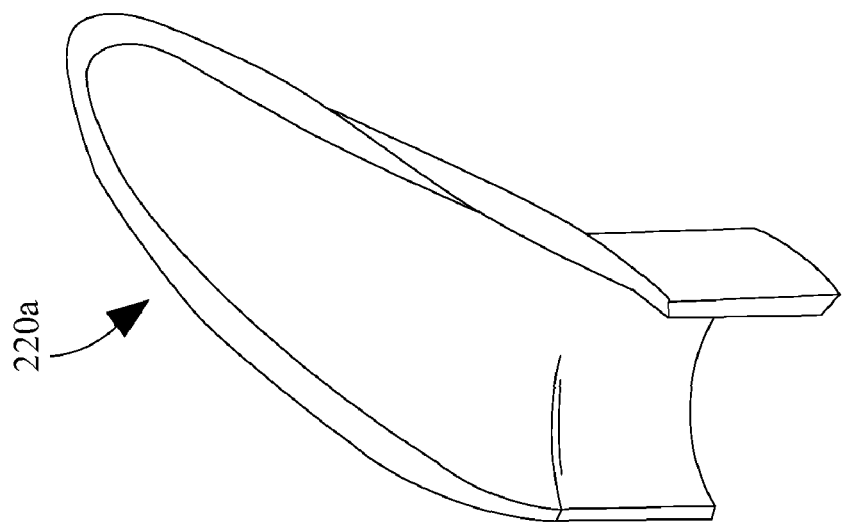
FIG. 8A and FIG. 8B are schematic diagrams showing different blades used in the invention.
Figure 8A:
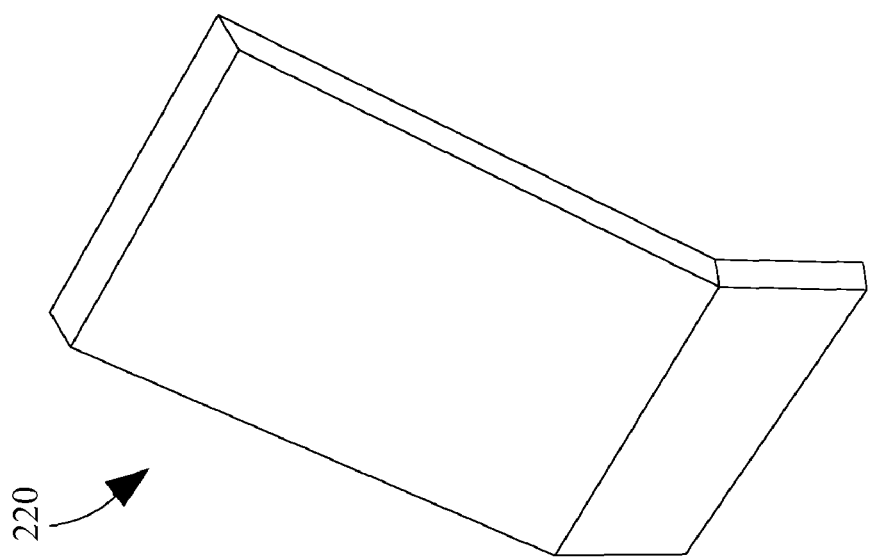

As shown in FIG. 3, there is an electrical generator 22 arranged inside the accommodation space 202 of the sprinkler body 20 at a position corresponding to the fluid guide 21. Moreover, there are a plurality of blades 220 mounted on the surface of the electrical generator 22 while enabling each blade 220 to be inclined by an inclining angle θ. Moreover, each blade 220 can be formed with a planar surface, as the one shown in FIG. 8A, or can be formed with a curved surface, as the blade 220a shown in FIG. 8B. Accordingly, as shown in FIG. 3, there will be an angle formed between the surface 2200 of each blade 220 facing toward the fluid guide 21 and its corresponding swirly fluid flow impinging thereon so that the propelling force from the swirly fluid flow is received thereby to be used for rotating the electrical generator 22 and thereby causing the same to generate an electrical power output. In this embodiment, there are magnets 203 arranged on the inner wall of the sprinkler body 20 that is facing toward the electrical generator 22 and there is a coil received inside the electrical generator 22, by that when the electrical generator 22 is driven to rotate by the propelling forces from the swirly fluid flows impinging on its blades 220, electricity can be generated by electromagnetic induction. Since the arranging of coil inside the electrical generator 22 is known to those skilled in the art, it is not described further herein.

Figure 1:
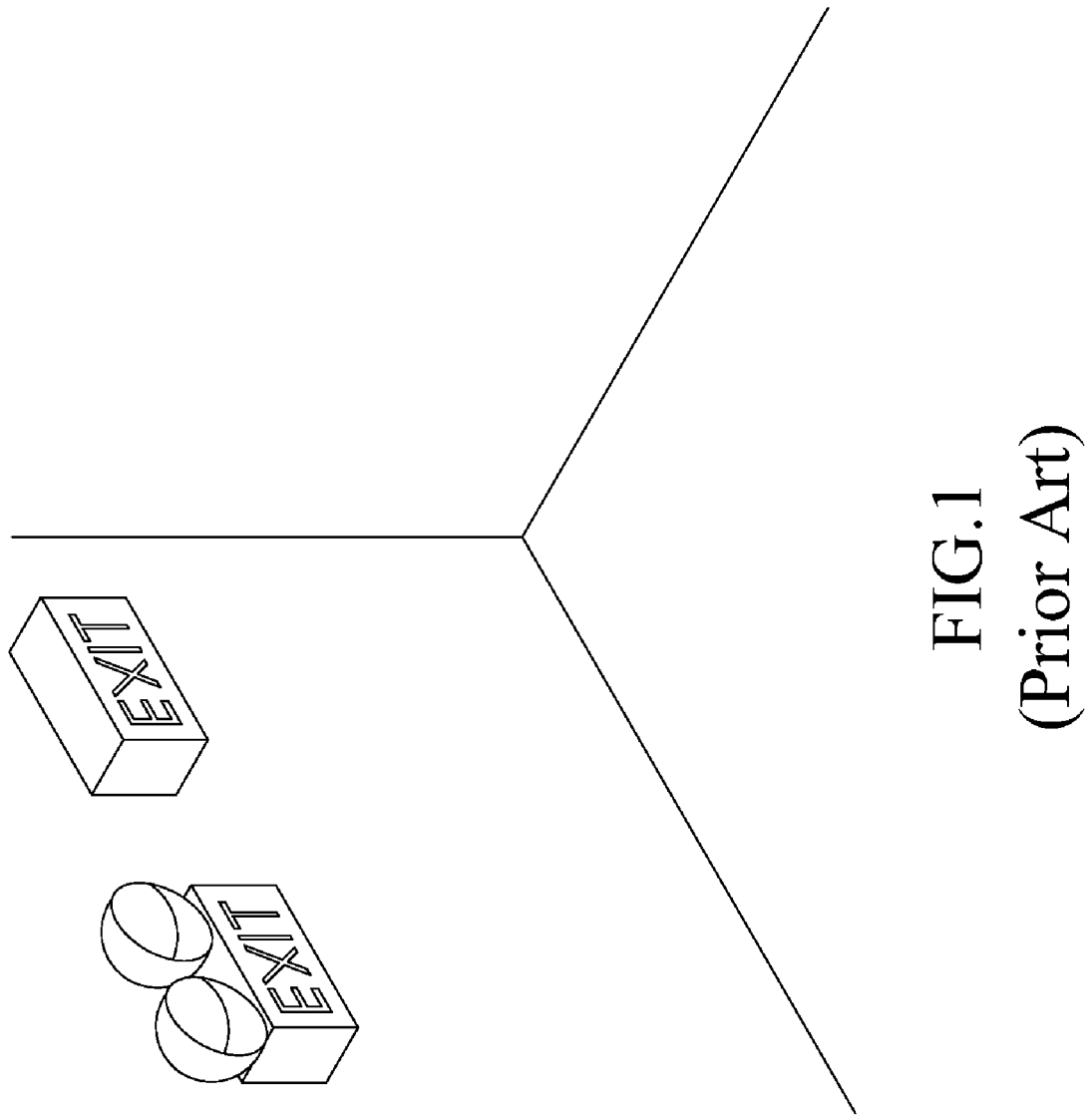
FIG. 1 is a sectional view of conventional emergency lightings and escape signs.
Figure 2:
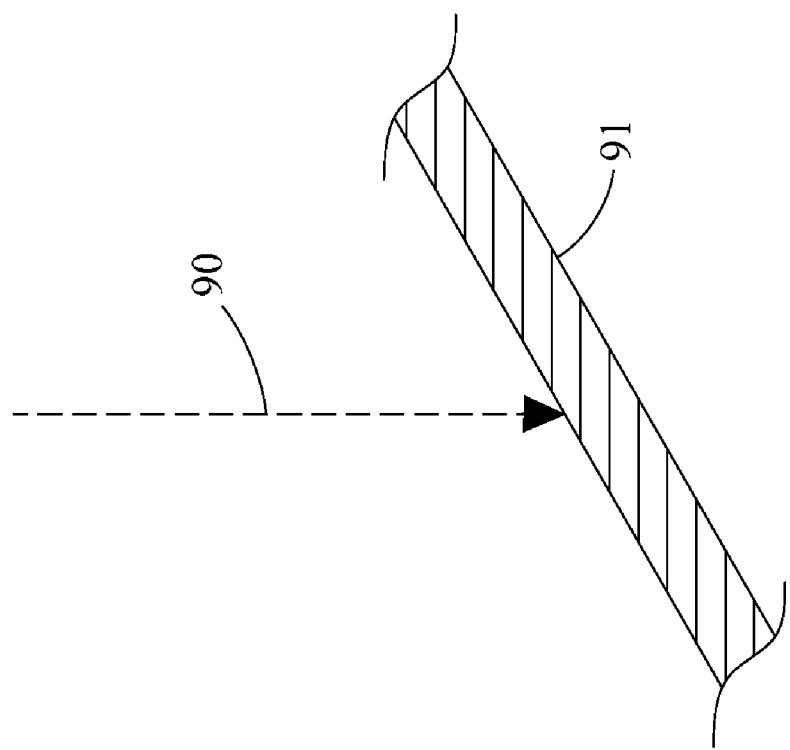
FIG. 2 is a schematic diagram showing how a flow of water is impinging by an angle upon a blade of a conventional water-powered generator.
Figure 4C:
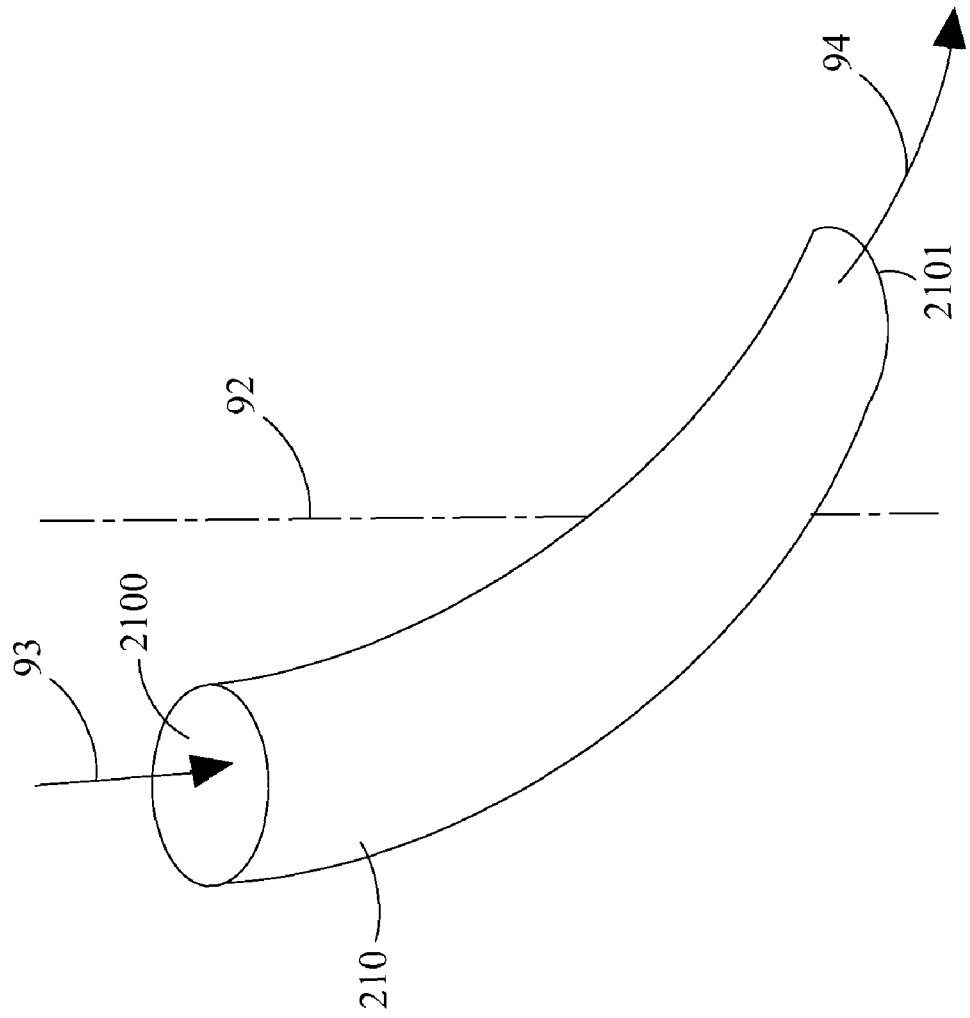
FIG. 4C is a schematic diagram showing a swirl channel according to an embodiment of the invention.
Figure 9:
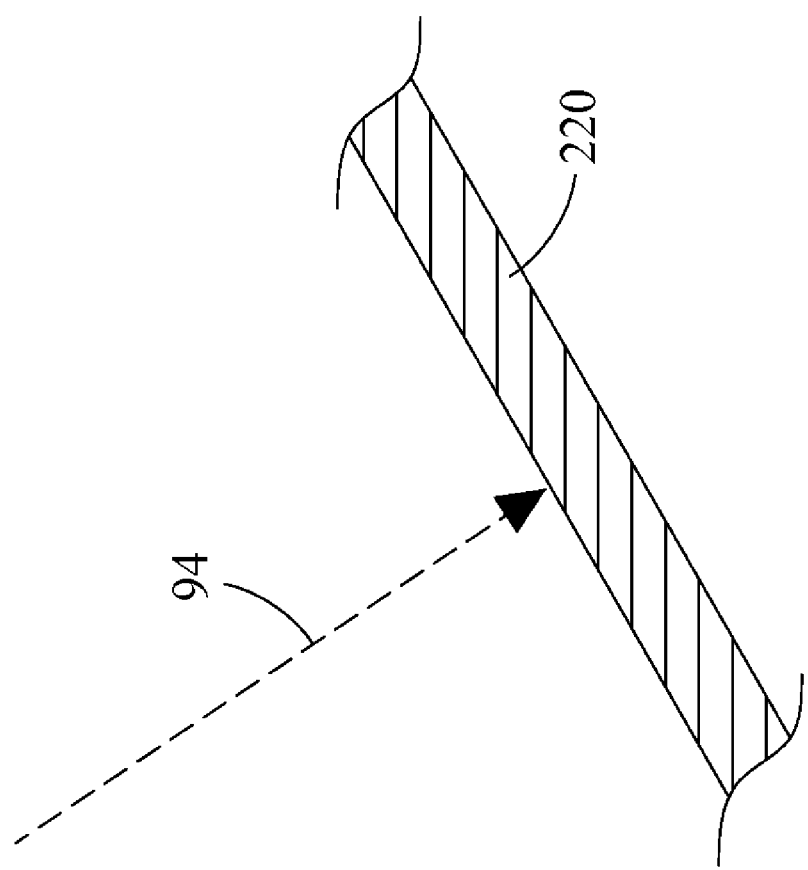
FIG. 9 is a schematic diagram showing how a fluid flow is impinging upon a blade of the present invention.

Please refer to FIG. 9, which is a schematic diagram showing how a fluid flow is impinging upon a blade of the present invention. As shown in FIG. 4C and FIG. 9, the fluid pressure measured at the fluid entrance end 2100 is the same as that measured at the fluid exit end 2101 according to Bernoulli's theorem. Therefore, when the fluid is flowing inside a swirl channel 210, its static pressure is increased by the affect from the structure of the swirl channel 210 and the same time that its dynamic pressure is also increasing during the flowing of the fluid inside the swirl channel 210. Moreover, as the swirly fluid flows 94 discharging from the swirl channels will impinge on the blades 220 in an orthogonal manner, all the pressure from the swirly fluid flows 94 will be exerted completely upon the blades without any loss, that is comparing with the situation shown in FIG. 2, so as to generate a maximum possible propelling force. In the situation shown in FIG. 2, certain trust components are lost due to the way relating to how the flow is impinging upon the blade. In addition, since the spinning angle of each swirl channel 210 is defined according to the inclining angle of the blade, the spinning angle can be determined for enabling the angle formed between the surface of each blade 220 facing toward the fluid guide 21 and its corresponding swirly fluid flow 94 impinging thereon to be a right angle as soon as the inclining angle of the blade 220 is determined.

Figure 10A:
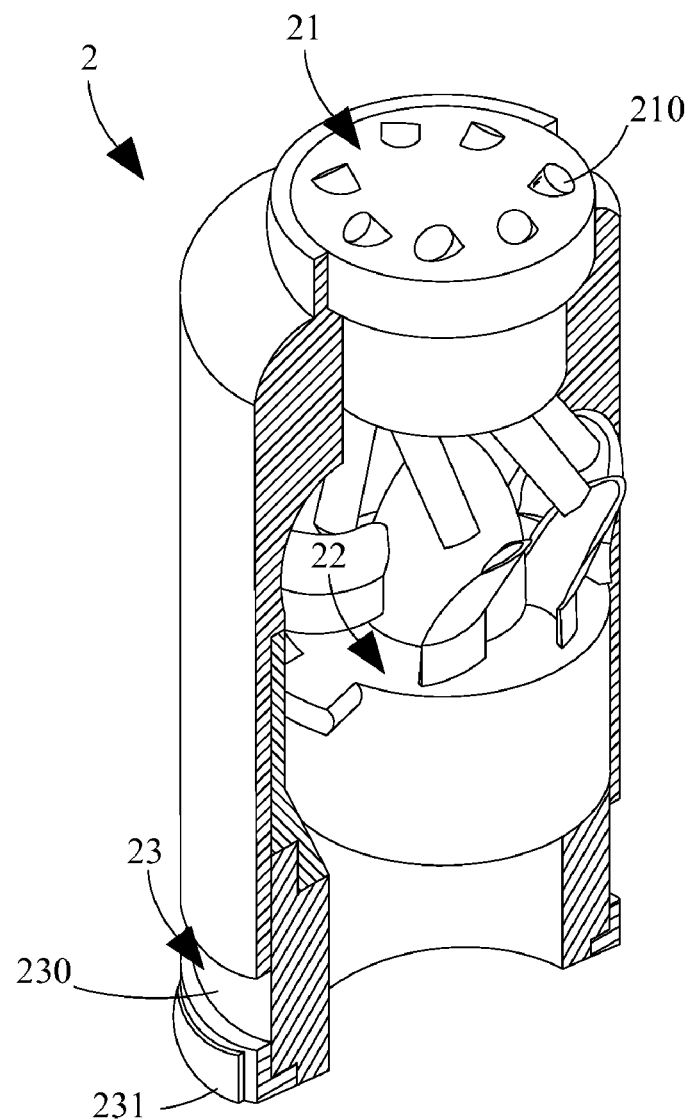
FIG. 10A and FIG. 10B are schematic diagrams showing a swirly fluid sprinkler integrated with a lighting module according to the present invention.
Figure 10B:
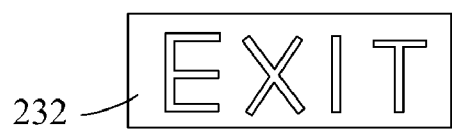

As shown in FIG. 3, there is a lighting module 23 disposed at a side of the sprinkler body 20 near the fluid outlet 201, which is electrically connected to the electrical generator 22 so as to be powered thereby. In this embodiment, the lighting module 23 is a light emitting diode module, but it is not limited thereby. In another embodiment shown in FIG. 10A and FIG. 10B, it can be a device composed of one light emitting diode module 230 and one laser module 231. Since the light intensity of laser module is high, it is capable of being covered by a panel with characters so as to enable the characters to be projected by the illumination of the laser module 230 onto a wall for directing person trapped in a building to escape.

Figure 11:
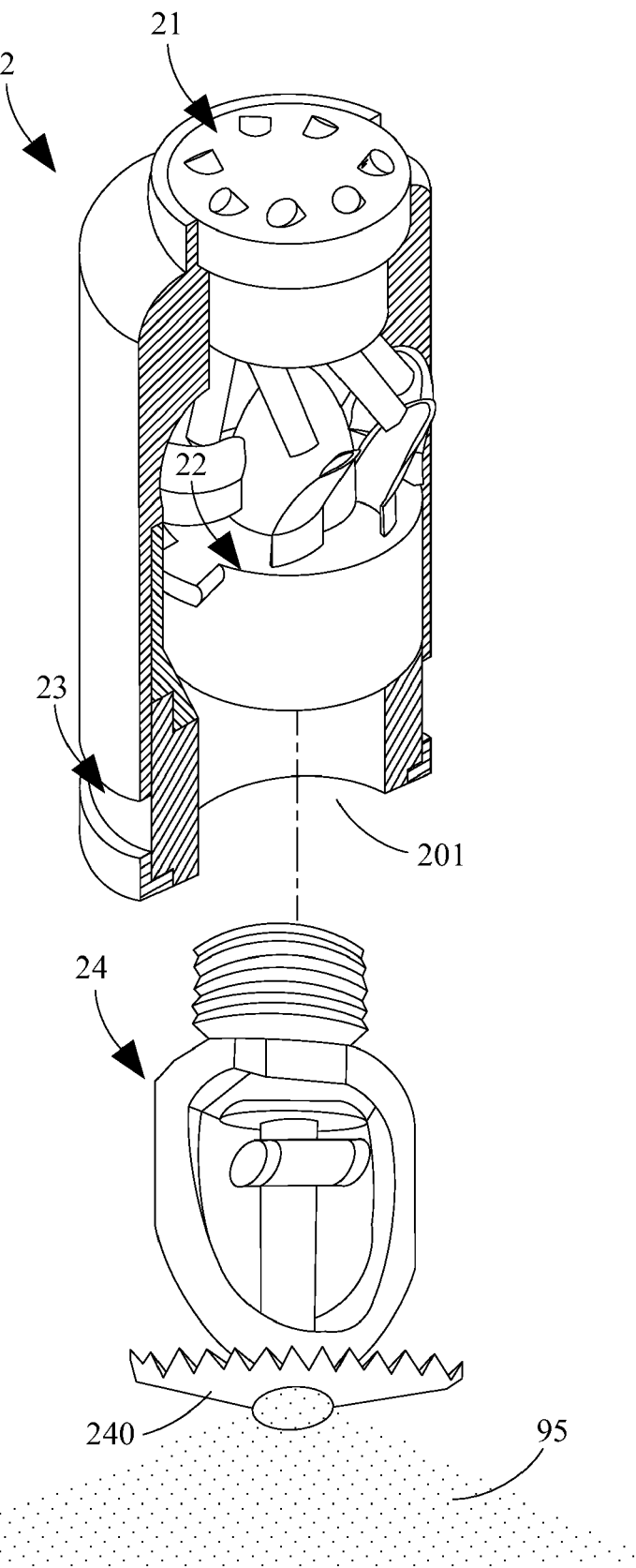
FIG. 11 is a schematic diagram showing a swirly fluid sprinkler according to an exemplary embodiment of the invention.

Please refer to FIG. 11, which is a schematic diagram showing a swirly fluid sprinkler according to an exemplary embodiment of the invention. In this embodiment, there is a shower 24 coupled to the fluid outlet 204 of the swirly fluid sprinkler 2, which is configured with a baffle plate 240. Thereby, the swirly fluid flows after flowing passing through the blades can be nebulized into mist 95 by the baffle plate 240 of the shower 24. There can be a variety of showers 24 capable of being adapted for the swirly fluid sprinkler of the invention, which are all known to those skilled in the art and thus are not described further herein.

Figure 12A:
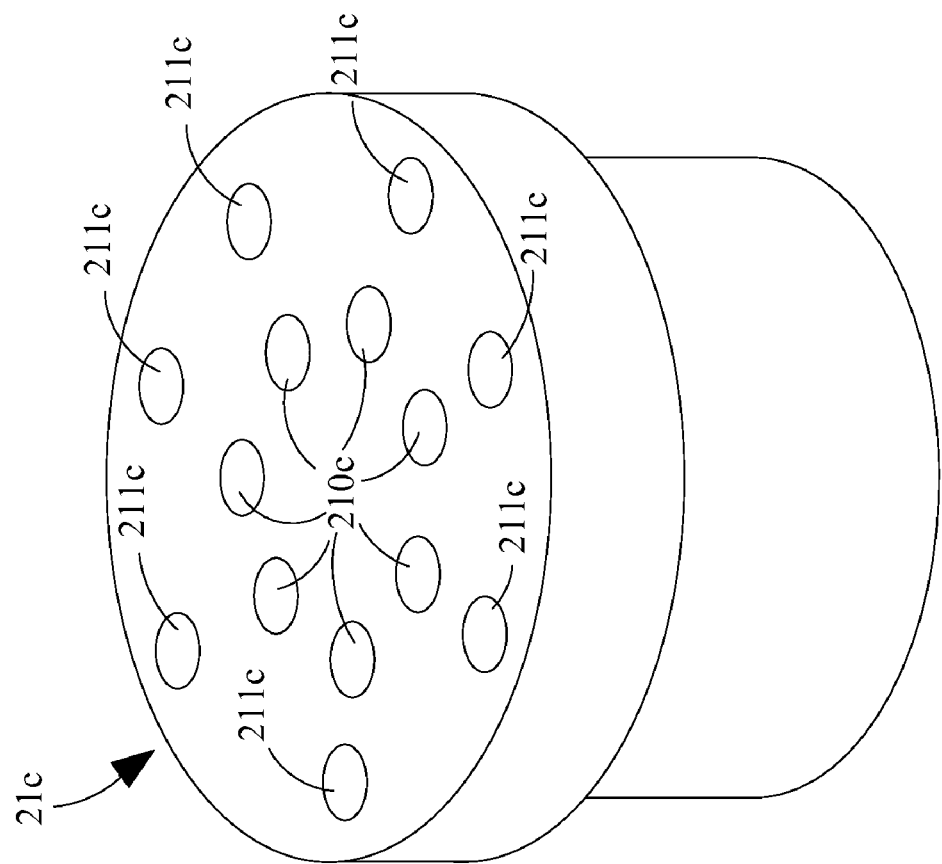
FIG. 12A and FIG. 12B are schematic diagrams showing a fluid guide according to yet another embodiment of the invention.
Figure 12B:
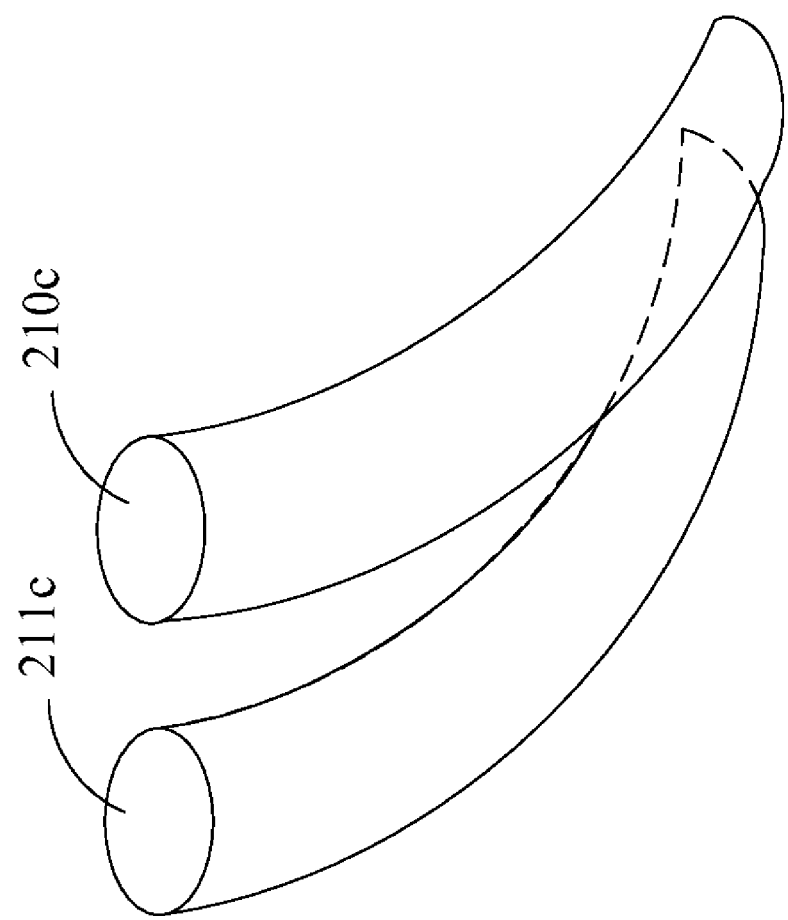

Please refer to FIG. 12A and FIG. 12B, which are schematic diagrams showing a fluid guide according to yet another embodiment of the invention. The swirl channels shown in the aforesaid embodiment are designed specifically for the blades with curved surfaces. In this embodiment, there are at least two types of swirl channels 210 being formed in the fluid guide 21, as the swirl channels 210c and 211c shown in FIG. 12A and FIG. 12B which are characterized by their different spinning angles. Since the two swirl channels 210c, 211c are spinning at different spinning angles, their resulting swirly fluid flows will working on their corresponding blades at different angle. It is noted that when the blades are formed with curved surface as the one shown in FIG. 8, the electricity generating efficiency will be low when the blade is flushed by swirly fluid flows of the same angle. Thus, when the blades with curved surfaces are flushed by flows from different swirl channels of different spinning angles, they will be impinged by swirly fluid flows with respect to different impinging angles so that the propelling force exerting on the blades are increased and thus the rotation speed of the electrical generator is increased.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

What is claimed is:

1. A swirly fluid sprinkler, comprising:
   a sprinkling body, having a fluid inlet and a fluid outlet;
   a fluid guide, disposed inside the fluid inlet of the sprinkling body and configured with a plurality of swirl channels for dividing a fluid flow into a plurality of swirly fluid flows, wherein each swirl channel is formed spinning along a specific axis so as to result in an appearance of vortices in the fluid flowing therein; and
   an electrical generator, disposed inside the sprinkling body at a position corresponding to the fluid guide, having a plurality of blades, each inclinedly disposed thereon by an inclining angle;
   wherein, an angle is formed between a surface of each blade facing toward the fluid guide and its corresponding swirly fluid flow impinging thereon so that a propelling force from the swirly fluid flow is received thereby to be used for rotating the electrical generator and thereby causing the electrical generator to generate an electrical power output.

2. The swirly fluid sprinkler of claim 1, wherein the fluid guide is configured with a plurality of spiral columns on the surface thereof in a manner that the spiral columns are spirally aligned with respect to each other for forming grooves between any two neighboring spiral columns to be used as the plural swirl channels.

3. The swirly fluid sprinkler of claim 1, wherein the fluid guide is configured with a plurality of grooves on the surface thereof to be used as the plural swirl channels, and the plural grooves are spirally aligned with respect to each other.

4. The swirly fluid sprinkler of claim 1, wherein the swirl channels are formed inside the fluid guide.

5. The swirly fluid sprinkler of claim 1, wherein a cross section of each swirl channel is formed in a shape selected from the group consisting of: a circular shape, an oval shape, a polygon, a geometrical shape defined by curves, and a geometrical shape defined by curved and straight lines.

6. The swirly fluid sprinkler of claim 1, wherein a sectional area of each swirl channel is reduced gradually from its fluid entrance end to its fluid exit end.

7. The swirly fluid sprinkler of claim 1, wherein the angle formed between the surface of each blade facing toward the fluid guide and its corresponding swirly fluid flow impinging thereon is a right angle.

8. The swirly fluid sprinkler of claim 1, further comprising:
   a shower, disposed near the fluid outlet, for nebulizing the plural swirl fluid flows after flowing passing through the electrical generator.

9. The swirly fluid sprinkler of claim 1, wherein each blade is formed with a curved surface.

10. The swirly fluid sprinkler of claim 9, wherein the plural swirl channels are swirl channels characterized by at least two different spinning angles, and the surface of each blade with curved surface is arranged corresponding to at least two swirl channels of different spinning angles.

11. The swirly fluid sprinkler of claim 1, further comprising:
    a lighting module, electrically connected to the electrical generator so as to be powered thereby.

12. The swirly fluid sprinkler of claim 11, wherein the lighting module is a device composed of at least one light emitting diode module.

13. The swirly fluid sprinkler of claim 11, wherein the lighting module is a device composed of at least one light emitting diode module and at least one laser module.

14. The swirly fluid sprinkler of claim 13, wherein the at least one laser module is covered by a panel with characters so as to enable the characters to be projected by the illumination of the at least one laser module.

* * * * *